(12) United States Patent
Burdick et al.

(10) Patent No.: US 8,185,870 B2
(45) Date of Patent: May 22, 2012

(54) MANAGING AN APPLICATION SOFTWARE PARTITION

(75) Inventors: Dean Joseph Burdick, Austin, TX (US); David Jones Craft, Austin, TX (US); Eric Philip Fried, Austin, TX (US); Vinit Jain, Austin, TX (US); Lance Warren Russell, Rosanky, TX (US); Marc Joel Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 11/564,316

(22) Filed: Nov. 29, 2006

(65) Prior Publication Data

US 2008/0127077 A1    May 29, 2008

(51) Int. Cl.
*G06F 9/44* (2006.01)
(52) U.S. Cl. .......... 717/120; 717/139; 718/102
(58) Field of Classification Search .......... 717/120–123, 717/139; 718/102
See application file for complete search history.

(56) References Cited

U.S. PATENT DOCUMENTS

| 7,779,404 | B2* | 8/2010 | Movassaghi et al. ......... 717/171 |
| 2004/0205272 | A1* | 10/2004 | Armstrong et al. ........... 710/260 |
| 2004/0255299 | A1* | 12/2004 | Brenner et al. ............... 718/102 |
| 2005/0022063 | A1* | 1/2005 | Grebenev ........................ 714/38 |
| 2005/0160411 | A1* | 7/2005 | Sangal et al. ................. 717/144 |
| 2007/0136723 | A1* | 6/2007 | Smith et al. ....................... 718/1 |

OTHER PUBLICATIONS

Dept. of Comput. Sci., Illinois Univ., Urbana, IL ; A commit protocol for checkpointing transactions; IEEE; Issue Date: Oct. 10-12, 1988; on pp. 22-31.*
Petru Eles, Zebo Peng, Krzysztof Kuchcinski and Alexa Doboli; System Level Hardware/Software Partitioning Based on Simulated Annealing and Tabu Search; SpringerLink; 1996; pp. 5-32.*

* cited by examiner

*Primary Examiner* — Wei Zhen
*Assistant Examiner* — Satish Rampuria
(74) *Attorney, Agent, or Firm* — Yee & Associates, P.C.; Steven L. Bennett

(57) ABSTRACT

A computer implemented method, apparatus, and computer usable program code for managing a software partition in logical partitioned data processing system. A virtual root process is created for the software partition, wherein the virtual root process functions as a root process for the software partition. The set of child processes is re-parented to the virtual root process in response to termination of a process having a set of child processes.

23 Claims, 5 Drawing Sheets

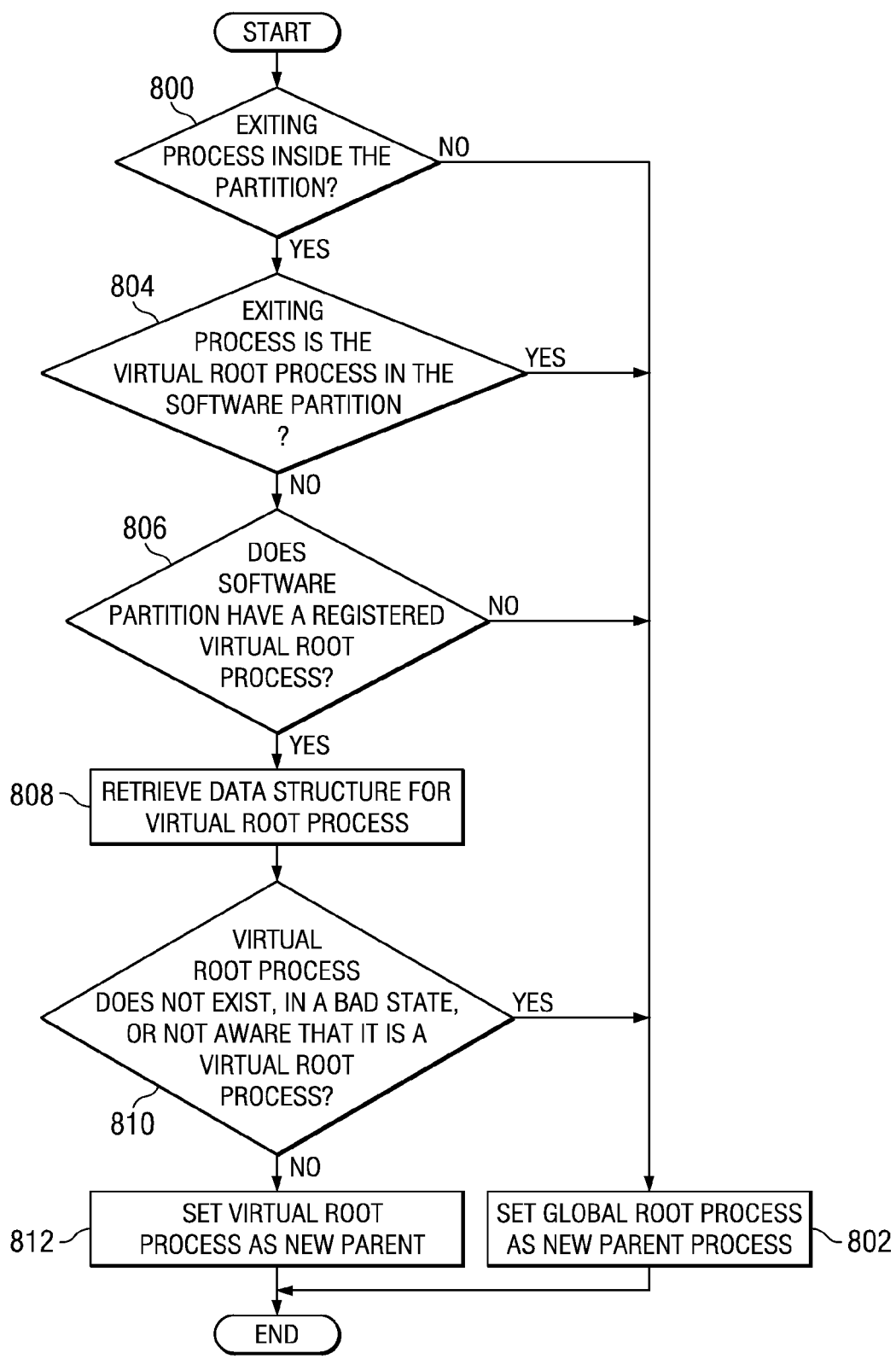

MANAGING AN APPLICATION SOFTWARE PARTITION

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer user program code for managing an application software partition.

2. Description of the Related Art

Software partitions provide an isolated environment within one operating system instance. In a software partition, processes may run, but do not interact with processes from other software partitions or from the global system itself. Two types of partitions may be found in logical partitioned data processing systems. One type is a system software partition. This type of partition appears as a full fledged virtual instance of the hosting operating system and has its own file systems and system services. Another type of software partition is an application software partition. An application software partition provides a process-isolated environment for a specific application or application suite. This type of partition is intended to be a quick and easy construct with minimal overhead. For example, no separate file systems or system services are present.

Many operating systems, particularly UNIX and Linux operating systems, use a common process tree paradigm, which is a hierarchal tree structure in which all processes are descended from one root process. In Linux and UNIX operating systems, this root process is also referred to as "init". Many processes and process environments rely on being able to view and trace their branch of this tree structure all the way back to the root process. In a process-isolated environment for a software partition, some concessions must be made to this requirement without forcing the applications themselves to change. As a result, a software partition provides a process at the root of its isolated tree of processes that at least appears to be "init".

This type of problem is solved in system software partitions by running a slightly customized version of the real "init" executable within the software partition. This type of solution, however, is not viable for an application software partition. The real root process is responsible for the management of system services in this type of partition, which are not desired in application software partitions. Further, many of these services experience conflicts if multiple instances are run in the same file system space.

When a process terminates, the parent of that process is notified and responsible for cleaning up, which involves performing operations like deleting data structures and releasing memory that may have been used by the process. During this clean up phase, the return status and resource usage for the exiting process are available to the parent process.

When a "parent" process in a process tree terminates, its orphaned "children" must be assigned a new position within the process tree. Typically, such processes are assigned or "re-parented" to the system's "init" or root process. This reallocation of processes within the hierarchy is performed using semantics such that those processes do not impose the same clean up requirements on the root process when they exit.

A problem arises when a process in an application software partition is orphaned in the manner described above. Existing mechanisms allow resource usage statistics and the return code of the exiting process to be collected by its parent process. However, the statistics of the child processes or "leaves" are lost when they are re-parented to the global root or "init" process. Further, the launcher of the processes may exit before those processes terminate because these processes leave the chain of the launcher, which is no longer aware of the processes. As a result, a false indication that an application software partition is completed or finished working may occur, and the resource usage statistics for the application software partition may be inaccurate. In addition, the paradigm of software partitioning is violated by having a process inside the software partition parented to a process outside of the software partition.

Therefore, it would be advantageous to have an improved computer implemented method, apparatus, and computer usable program code for managing application software partitions.

SUMMARY OF THE INVENTION

The illustrative embodiments provide a computer implemented method, apparatus, and computer usable program code for managing a software partition in a data processing system. A virtual root process is created for the software partition, wherein the virtual root process functions as a root process for the software partition. The set of child processes is re-parented to the virtual root process in response to termination of a process having a set of child processes.

Each re-parented child process becomes a regular child of the virtual root process, which is therefore capable of collecting its return code and resource usage statistics when the child process subsequently exits. Further, the virtual root process is prevented from exiting prematurely by the presence of the re-parented child process in its list of child processes.

In re-parenting, a data structure is retrieved for the virtual root process and the orphaned child process is assigned to the virtual root process using the data structure for the virtual root process.

The data structure contains a process identifier and a virtual process identifier. The data structure, representing the virtual root process, is a first data structure. Assigning the orphaned child process to the virtual root process using this first data structure includes adding the process identifier in the first data structure as a parent identifier in a second data structure for the orphaned child process, and adding the virtual process identifier in the first data structure as a virtual parent identifier in the second data structure for the orphaned child process.

In the illustrative embodiments, the saved information may include a return code for the exiting child process. The saved information also may include processor cycles used by the exiting child process. The software partition may be an application software partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of an operation for determining the appropriate process to which to re-parent orphaned child processes in accordance with an illustrative embodiment.

DETAILED DESCRIPTION OF THE PREFERRED EMBODIMENT

Figure 1:
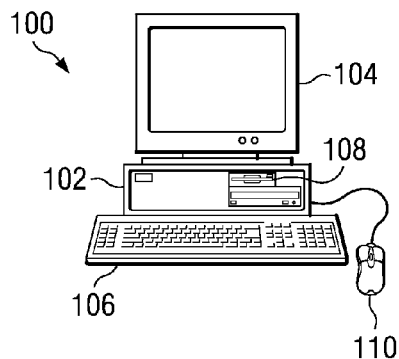
FIG. 1 is a pictorial representation of a data processing system in accordance with an illustrative embodiment.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
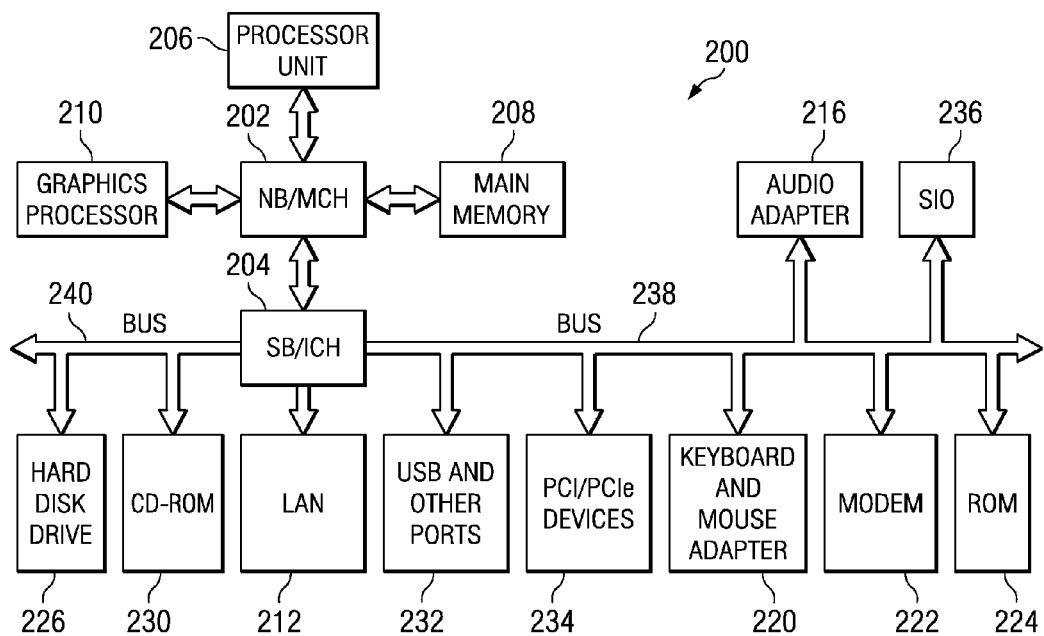
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The different embodiments recognize that when a parent process in a tree terminates before its child processes, those orphaned child processes are typically reassigned to the system's "init" or root process. This root process is a global root process in currently used logical partitioned data processing systems. The different embodiments recognize that such a re-parenting of an orphaned process to the global root breaks the integrity of the process tree as perceived both inside and outside of this particular application software partition.

Thus, the illustrative embodiments provide a computer implemented method, apparatus, and computer usable program code for managing software partitions. Particularly, the different embodiments may be applied to managing an application software partition. A virtual root process is created for the application software partition in which the virtual root process functions as a root process for this partition. In response to the termination of a process having a set of child processes, the set of child processes are re-parented to the virtual root process rather than the actual global root process.

Each time an orphaned child process is assigned to the virtual root process, the orphaned child process is added to the virtual root process's list of child processes. Furthermore, the process identifier of the virtual root process is added to the data structure of the child process as the parent process identifier. Whenever a child process exits, a determination is made as to whether the exiting child process has the parent process identifier obtained for the root process. An exiting child process is a process that has completed execution or is terminating for one reason or another.

The information about the exiting child process is saved by the root process if the exiting child process has the process identifier obtained through the root process. This information may take various forms. For example, the information may be a numeric return code indicating success or failure. The information may be the number of processor cycles used by the exiting child process, the amount of memory used by the exiting child process, or any number of other statistics relating to the resource usage of the child process.

The root process continues to save information each time a child process exits. When no more child processes are present, the virtual root processes returns the saved information and may terminate execution.

Re-parenting, in these examples, means that the orphaned child process is assigned or associated with the virtual root process. This reassignment or re-parenting of an orphaned child process to the virtual root process is implemented using currently available procedures for handling orphaned child processes.

The illustrative embodiments modify this procedure by using a data structure for the virtual root process, rather than the global root process, in the re-parenting procedure. This data structure includes a process identifier for the virtual root process and a virtual process identifier for the virtual root process. In operating systems in which the global root process has a known, static process identifier (e.g. 1 in UNIX and Linux operating systems), the virtual process identifier is assigned that known, static value.

In these examples, the re-parenting involves adding the process identifier for the virtual root process as a parent identifier to the data structure for the orphaned child process. The virtual process identifier for the root process also is added as the virtual parent identifier in the data structure for the orphaned process. These data structures are used to allow processes to identify other processes, such as a parent process, child processes, and sibling processes.

Figure 3:
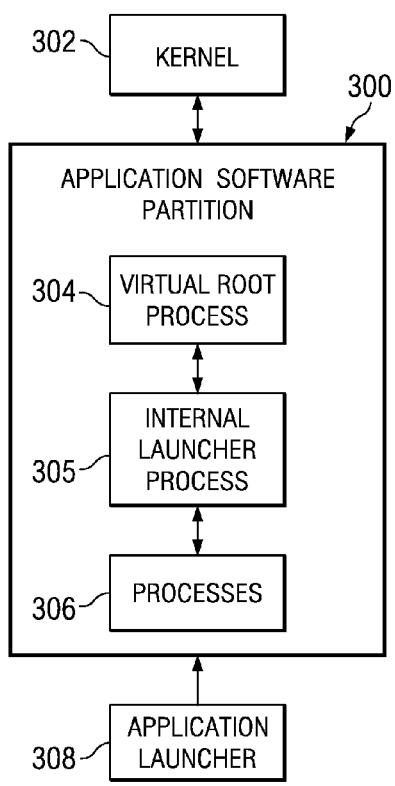
FIG. 3 is a diagram illustrating components used in managing a software partition in accordance with an illustrative embodiment.

Turning now to FIG. 3, a diagram illustrating components used in managing a software partition is depicted in accordance with an illustrative embodiment. In this example, application software partition 300 is an example of a software partition in which processes of the illustrative embodiments may be implemented.

In this example, application software partition 300 contains virtual root process 304, internal launcher process 305, and processes 306. Processes 306 contain processes in a hierarchy in which a set of one or more of these processes are child processes to internal launcher process 305, which is a direct child process to virtual root process 304. Within processes 306, child, sibling, and parent processes may be present. Application launcher 308 is a process or program that initiates execution of the virtual root process 304, which subsequently initiates execution of internal launcher process 305. This launcher then initiates processes 306 in application software partition 300.

In these examples, internal launcher process 305 launches processes 306. Virtual root process 304 only tracks internal launcher process 305 and any orphaned processes within processes 306 that may become re-parented to virtual root process 304. The re-parenting of orphaned child processes to virtual root process 304 allows virtual root process 304 to avoid terminating before all the processes have completed execution. In these examples, virtual root process 304 only returns the return code of internal launcher process 305. Of course, depending on the particular implementation, virtual root process 304 also may return return codes for orphaned child processes. In these examples, the re-parenting of processes is performed by kernel 302, which is a component in the operating system.

Without the features of the illustrative embodiments, orphaned processes in application software partitions are re-parented to a global root process. The illustrative embodiments employ a virtual root process that allows for re-parenting to occur to virtual root process 304. In currently used systems, the information about process execution for orphaned processes is lost when these orphaned processes are re-parented to the global root process. Further, loss of information may occur because current procedures do not impose the same clean up requirements on orphaned child processes when they are re-parented to the global root process. In other words, currently, the information about process execution is not saved or collected by the global root process when an orphaned process in an application software partition is re-parented to the global root process. The different embodiments recognize that this situation results in a loss of information regarding the execution of processes within an application software partition 300.

The different illustrative embodiments may be implemented within the components illustrated in FIG. 3. In particular, the re-parenting of orphaned processes within processes 306 may be performed by kernel 302. In these illustrative examples, virtual root process 304 may handle saving information for any child process to virtual root process 304. When a process, such as an orphaned process within processes 306, is re-parented to virtual root process 304, virtual root process 304 adds the re-parented orphaned child process to a list of child processes maintained in a data structure for virtual root process 304.

In this manner, whenever a child process to virtual root process 304 exits, virtual root process 304 may collect the information about the exiting process. In these examples, virtual root process 304 only collects the return code for internal launcher process 305, whereas resource usage statistics are accumulated for all child processes in these examples. Of course, depending on the particular implementation, virtual root process 304 also may obtain return code information from re-parented child processes that exit or terminate execution. In these examples, virtual root process 304 detects the exiting of a child process through a signal sent to virtual root process 304 from the exiting child process. In these examples, virtual root process 304 collects information about orphaned processes that otherwise may have been lost. When all of the processes have terminated, virtual root process 304 then returns any saved information. In these examples, the saved information is returned to application launcher 308.

The use of the virtual root process 304 allows for a process within processes 306 in application software partition 300 to collect information about execution within this partition. In these examples, virtual root process 304 is a process that is associated with the application launcher that initiates the execution of processes within application software partition 300. In these examples, virtual root process 304 may be tooled or act as a wrapper for internal launcher process 305. As a result, when execution completes, virtual root process 304 returns information saved about internal launcher processes 305 and processes 306 to the requestor, which is application launcher 308 in this example.

Figure 4:
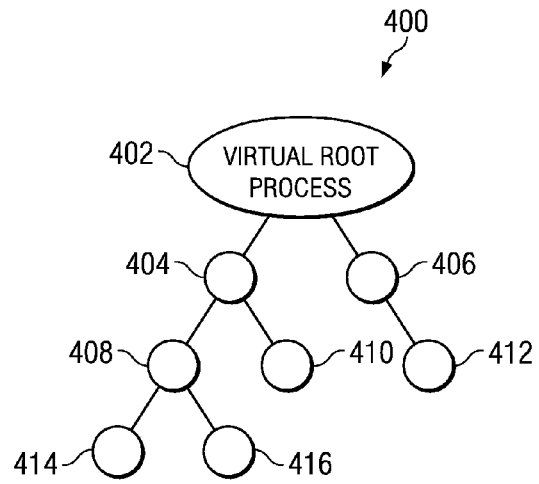
FIG. 4 is a diagram illustrating a hierarchy of processes in accordance with an illustrative embodiment.

Turning now to FIG. 4, a diagram illustrating a hierarchy of processes is depicted in accordance with an illustrative embodiment. In this example, the hierarchy takes the form of tree structure 400. Tree structure 400 is established through a set of data structures in which information pointing to parent processes, child processes, and sibling processes is present. These pointers allow for the different processes to be able to identify other processes executing within the hierarchy. All branches or paths within this hierarchy terminate at virtual root process 402. Tree structure 400 contains virtual root process 402. Virtual root process 402 is initiated as a process associated with an application launcher that launches the execution of processes within tree structure 400.

Process 404 and process 406 are child processes to virtual root process 402. Process 404 and process 406 are sibling processes to each other. Processes 408 and 410 are child processes to process 404, which is a parent process to these processes. Process 412 is a child process to process 406. Processes 408 and 410 are sibling processes. Processes 414 and 416 are child processes to process 408.

If a process, such as process 408, terminates before processes 414 and 416, these processes are considered orphaned child processes. The illustrative embodiments cause a re-parenting or re-association of processes 414 and 416 to virtual root process 402. This re-parenting is in contrast to the currently used mechanism, which results in re-parenting of these processes to a global root process outside of tree structure 400.

Virtual root process 402 also is set to save information for these processes. In this manner, when execution of all processes below virtual root process 402 terminates, virtual root process 402 returns the information to the launching application.

Figure 5:
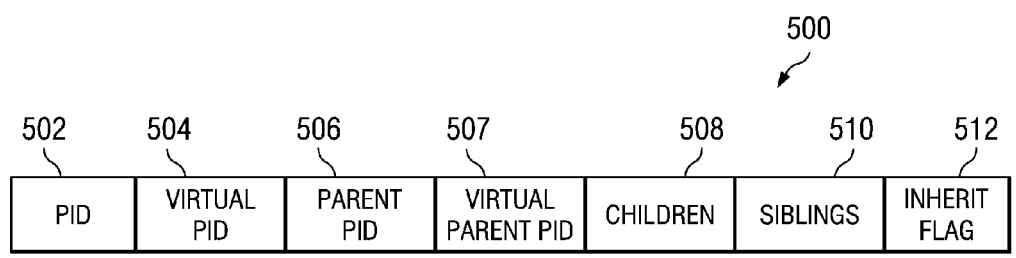
FIG. 5 is a diagram of a data structure or process in accordance with an illustrative embodiment.

Turning now to FIG. 5, a diagram of a data structure for a process is depicted in accordance with an illustrative embodiment. In this example, data structure 500 is examplary of the data structure used by each node in tree structure 400 in FIG. 4 to maintain the relationships or associations between different processes. Data structure 500 contains a number of fields including process identifier (PID) 502, virtual process identifier (PID) 504, parent process identifier (PID) 506, virtual parent process identifier (PID) 507, children 508, siblings 510, and inherit flag 512. In these examples, children 508 and siblings 510 contain pointers to other data structures similar to data structure 500.

Process identifier 502 is the process identifier for the process. This identifier is unique with respect to other processes that are outside of the application software partition. Virtual process identifier 504 is the identifier assigned to the process for visibility within the hierarchy for the software partition. For example, with reference back to FIG. 4, virtual root process 402 may have a process identifier of 15. This identifier is not the identifier expected by other processes within tree structure 400 for a software partition. As a result, the virtual process identifier is set equal to one, which is the expected identifier for a root process.

In this manner, processes executing within a software partition may look for the root process using the virtual identifier to maintain the integrity of processes being contained within a separate partition or operating environment.

Parent process identifier 506 contains a pointer or process identifier to the parent process. Virtual parent process identifier 507 is the identifier assigned to the parent in the hierarchy for the software partition in these examples. Any child processes of the process are stored in children 508. Any sibling processes that are present are stored in siblings 510.

Inherit flag 512 is used to determine how the process will treat child processes when they exit. When inherit flag 512 is set, the parent process does not wait to clean up or save information for the child processes. In the illustrative examples, when a process is re-parented to a virtual root process, this flag is left unset so that that process will save information.

Figure 6:
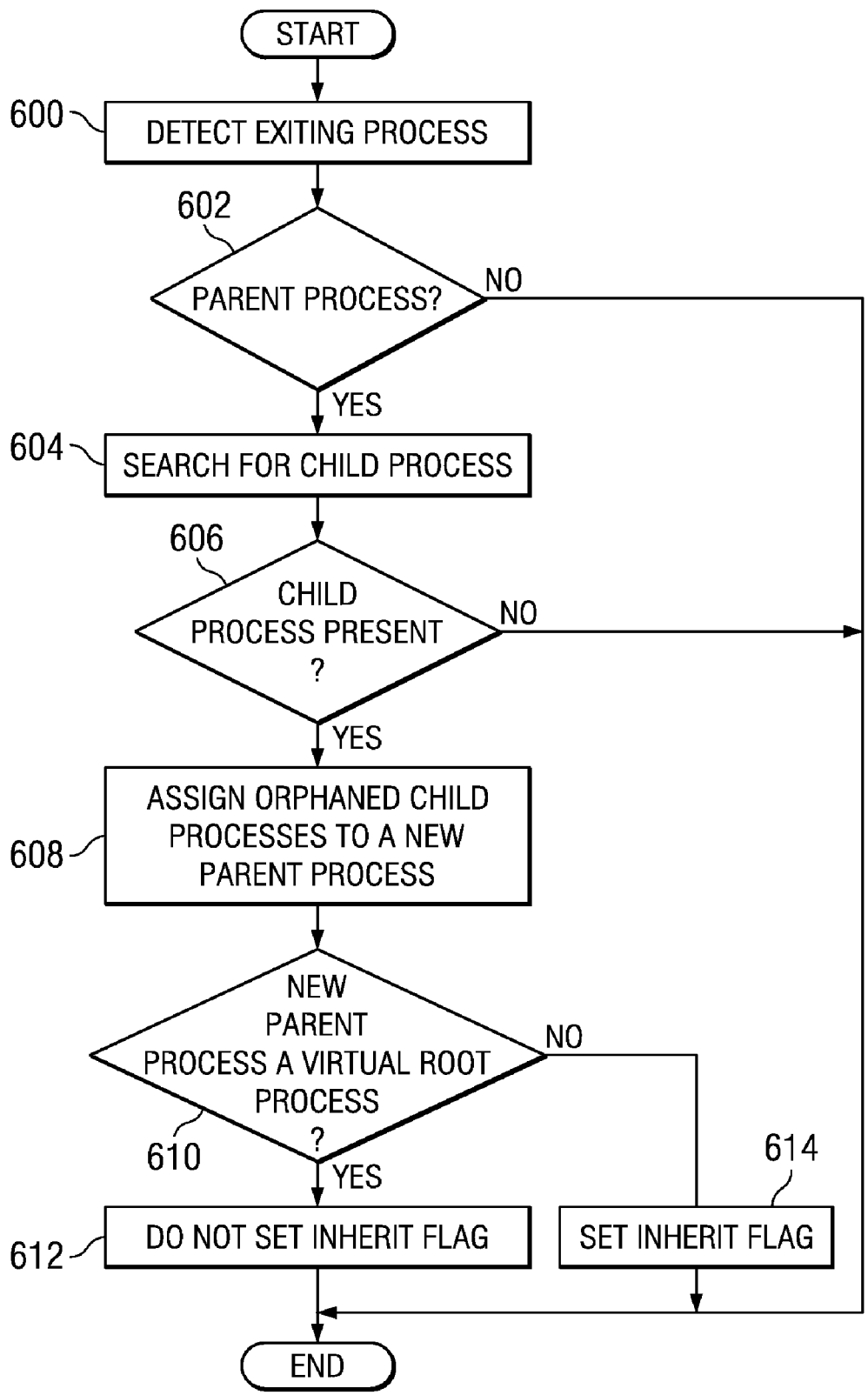
FIG. 6 is a flowchart of an operation for re-parenting orphaned processes in accordance with an illustrative embodiment.

Turning now to FIG. 6, a flowchart of an operation for re-parenting orphaned processes is depicted in accordance with an illustrative embodiment. The operation illustrated in FIG. 6 may be implemented in a software component, such as kernel 302 in FIG. 3. The mechanism depicted in this operation involves shuffling pointers in data structures such that the direct children are removed from the data structure of the exiting process and added to the data structure of the new parent. Any indirect descendants of the re-parented data process are automatically added to that data structure through the pointers.

The operation begins by detecting an exiting process (step 600). A determination is made as to whether this process is a parent process (step 602). If the process is a parent process, a search is made to determine whether the parent process has any child processes (step 604). In these examples, the determination may be made by searching the data structure for this parent process. An example of this data structure is data structure 500 in FIG. 5. Thereafter, a determination is made as to whether any child processes are present (step 606).

If one or more child processes are present, the identified child processes are assigned to a new parent process (step 608). Next, a determination is made as to whether the new parent process is a virtual root process (step 610). If the new parent process is a virtual root process, an inherit flag is not set in the data structure for the new parent process (step 612) with the operation terminating thereafter. Otherwise, the inherit flag is set in the data structure (step 614) with the operation terminating thereafter.

With reference again to step 606, if one or more child processes are not present, the operation terminates. The operation also terminates if the exiting process is not a parent process in step 602.

Figure 7:
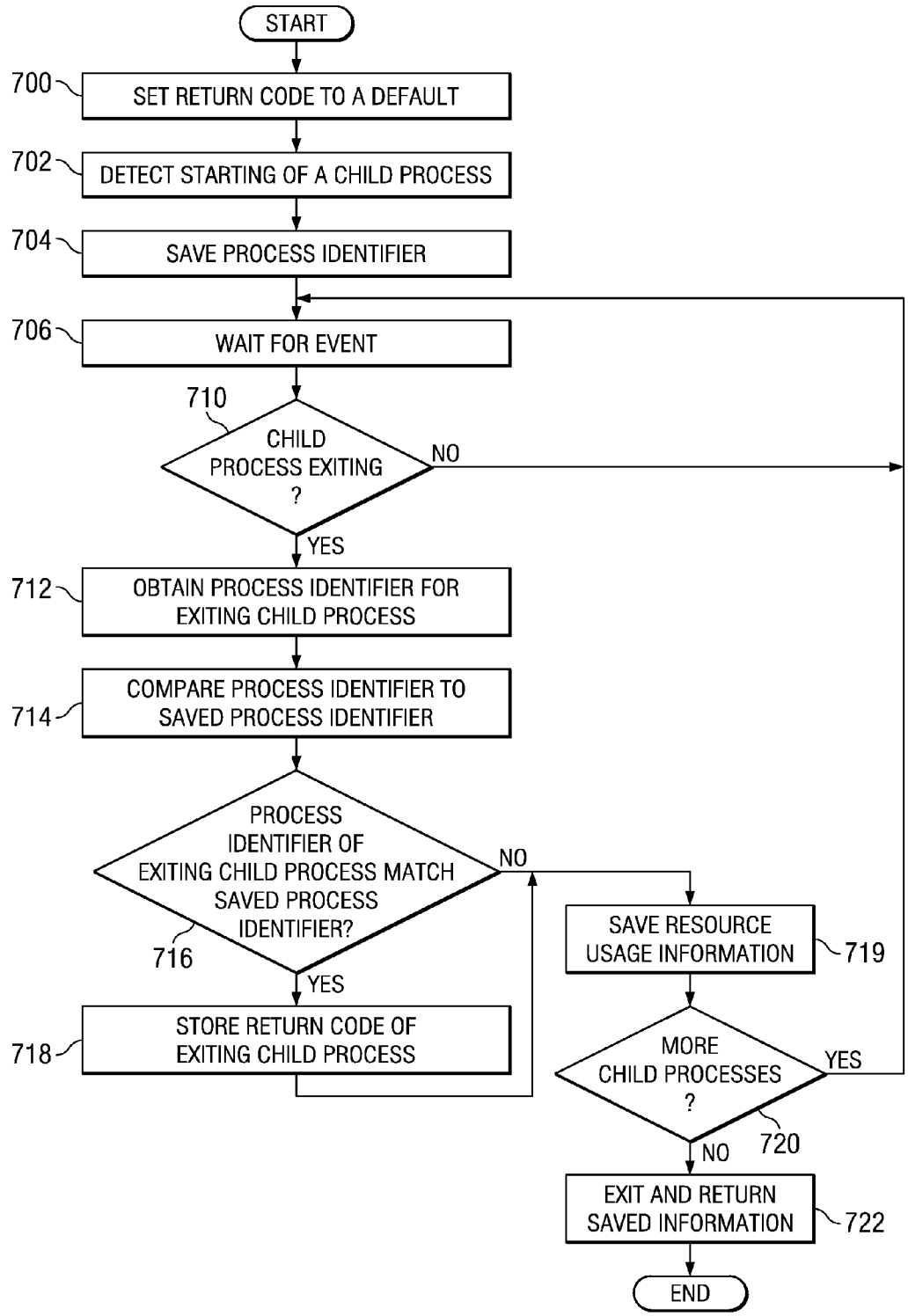
FIG. 7 is a flowchart of an operation for returning information from the execution of processes within a software partition in accordance with an illustrative embodiment.

Turning next to FIG. 7, flowchart of an operation for returning information from the execution of processes within a software partition is depicted in accordance with an illustrative embodiment. The process illustrated in FIG. 7 may be implemented in a software component, such as virtual root process 304 in FIG. 3.

The operation begins by setting a return code to a default return code (step 700). This step is used to ensure that some return code will be returned when the virtual root process finishes execution. Next, the operation spawns or initiates an internal launcher through a system call, which returns the process ID of this launcher to the virtual root process (step 702). The operation saves the process identifier of this child process (step 704). In these examples, child processes are stored in a data structure, such as data structure 500 in FIG. 5. In these illustrative examples, data structures, such as data structure 500 are maintained by the kernel. The virtual root process does not track the level of information in these data structures. In particular, the only information stored is the process ID, which is saved as single data element in the virtual root process. This process ID is effectively a copy of the process ID stored in data structure 500. In particular, the information may be stored in children 508 in FIG. 5.

Thereafter, the operation waits for an event (step 706). When the event occurs, a determination is made as to whether the event is a child process exiting (step 710). If the event is not an exiting child process, the operation returns to step 706.

If the child process is exiting, the operation obtains the process identifier for the exiting child process (step 712). Next, the process identifier for the exiting child process is compared to the saved process identifier (step 714). A determination is made as to whether the process identifier of the exiting child process matches the saved process identifier (step 716). In these examples, the child process that is being looked for is the internal launcher. Of course, depending on the implementation, the processes also may include orphaned child processes that have been re-parented to the virtual root process.

If the process identifier of the exiting child process matches the saved process identifier, the return code of the exiting child process is stored (step 718). In these examples, the return code is a number. Resource usage information, located in a separate data structure available upon the exit of any child process, including those which have been re-parented to the virtual root process, is saved (step 719). The resource usage information may include, for example, processor cycles used, memory used, data structures used, and other information regarding the execution of the exiting child process. This and other saved information is retrieved by the external launcher when the external launcher receives the return code from the virtual root process when the virtual root process exits. In these examples, the external launcher is application launcher 308 in FIG. 3. A determination is made as to whether additional child processes are presently executing (step 720). If additional child processes are still executing, the process returns to step 706. Otherwise, the process exits and returns the saved information to the application launcher (step 722) with the process terminating thereafter.

With reference again to step 716, if the process identifier of the exiting child process does not match the saved process identifier, the process proceeds directly to step 719, saving the resource usage information for the process. Referring back to FIG. 5, this information is only available from this re-parented child because inherit flag 512 was not set when the re-parenting occurred.

Turning now to FIG. 8, a flowchart of an operation for identifying a new parent process for an orphaned child process is depicted in accordance with an illustrative embodiment. The operation illustrated in FIG. 8 is a more detailed description of step 608 in FIG. 6.

The operation begins by determining whether the exiting process is inside the software partition (step 800). If the exiting process is not inside the software partition, the global root process is used as the new parent process (step 802), with the operation terminating thereafter. Otherwise, a determination is made as to whether the exiting process is the virtual root process inside a software partition (step 804). If the exiting process is the virtual root process inside the software partition, the operation proceeds to step 802 as described above.

On the other hand, if the exiting process is not the virtual root process, a determination is made as to whether the software partition has a registered virtual root process (step 806). If the software partition does not have a registered virtual root process, the operation proceeds to step 802. Otherwise, a data structure for the virtual root process is retrieved (step 808). Next, a determination is made as to whether the virtual root process does not exist, is in a bad state, or is not aware that it is a virtual root process (step 810). In these examples, if the virtual process identifier of the virtual root process is not equal to one, the virtual root process is not aware that it is a virtual root process. If any of these conditions is true, the operation proceeds to step 802. Otherwise, the virtual root process is set as the new parent (step 812) with the operation terminating thereafter.

Thus, the illustrative embodiments provide a computer implemented method, apparatus, and computer user program code for managing process hierarchy in a software partition. A virtual root process is created for the software partition. This virtual root process functions as a root process in the partition. Whenever a process having a set of child processes terminates, the child processes are re-parented or assigned to the virtual root process. When an exiting process is detected, a determination is made as to whether the exiting process is a child process to the virtual root process. If the exiting child process is a child process to the virtual root process, then information for that child process is saved. When all of the child processes to the virtual root process have completed execution, the virtual root process returns the saved information and terminates execution.

In this manner, the different illustrative embodiments allow for the process integrity of a software partition to be maintained. The different embodiments are especially useful in application software partitions in which the software partition typically does not have its own root process but rather is part of a tree structure containing a global root process that is outside of the application software partition. Further, the different embodiments allow for re-parenting of orphaned processes to the virtual root process in a manner that allows for the virtual root process to collect execution information and return that execution information when work actually has completed. By re-parenting all orphaned processes within an application software partition to the virtual root process, the indication that work has completed does not occur until all of the processes have finished execution. In this manner, a false indication that an application has finished work is avoided.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a software partition in logical partitioned data processing system, the computer implemented method comprising the steps of:
    creating a virtual root process for the software partition, wherein the virtual root process functions as a root process for the software partition; and
    responsive to termination of a process having a set of child processes, re-parenting the set of child processes to the virtual root process by retrieving a first data structure for the virtual root process and assigning the set of child processes to the virtual root process using the first data structure, wherein the virtual root process exits after the set of child processes completes execution, the first data structure includes a process identifier and a virtual process identifier, the set of child processes includes a child process, and assigning the set of child processes to the virtual root process using the first data structure includes adding the process identifier in the first data structure as a parent identifier in a second data structure for the child process and adding the virtual process identifier in the first data structure as a virtual parent identifier in the second data structure for the child process.

2. The computer implemented method of claim 1 further comprising the steps of:
    responsive to an assignment of the child process in the set of child processes to the virtual root process, obtaining a process identifier for the child process to form an identified process identifier;
    responsive to detecting an exiting child process, determining whether the exiting child process has the identified process identifier; and
    saving information about the exiting child process if the exiting child process has the identified process identifier to form saved information.

3. The computer implemented method of claim 1, wherein the first data structure includes a parent process identifier and a virtual parent process identifier.

4. The computer implemented method of claim 1, wherein the software partition is an application software partition.

5. The computer implemented method of claim 2 further comprising the steps of:
    responsive to detecting the exiting child process, determining whether another child process in the set of child processes is still executing; and
    responsive to an absence of the another child process in the set of child processes that is still executing, returning all saved information.

6. The computer implemented method of claim 2, wherein the saved information includes a return code for the exiting child process.

7. The computer implemented method of claim 2, wherein the saved information comprises processor cycles used by the exiting child process.

8. The computer implemented method of claim 2, wherein the saving step comprises sending a return code to an application initiating the software partition.

9. The computer implemented method of claim 2, wherein the saving step comprises:
sending saved statistics to an application initiating the software partition, wherein the statistics comprises cumulative totals for all processes having been executed in the software partition.

10. A computer program product comprising:
a non-transitory computer usable medium having computer usable program code for managing a software partition in logical partitioned data processing system, the computer program medium comprising:
computer usable program code for creating a virtual root process for the software partition, wherein the virtual root process functions as a root process for the software partition; and
computer usable program code, responsive to termination of a process having a set of child processes, for re-parenting the set of child processes to the virtual root process by retrieving a first data structure for the virtual root process and assigning the set of child processes to the virtual root process using the first data structure, wherein the virtual root process exits after the set of child processes completes execution, the first data structure includes a process identifier and a virtual process identifier, the set of child processes includes a child process, and assigning the set of child processes to the virtual root process comprises computer usable program code for adding the process identifier in the first data structure as a parent identifier in a second data structure for the child process and adding the virtual process identifier in the first data structure as a virtual parent identifier in the second data structure for the first child process.

11. The computer program product of claim 10 further comprising:
computer usable program code, responsive to an assignment of the child process in the set of child processes to the virtual root process, for obtaining a process identifier for the first child process to form an identified process identifier;
computer usable program code, responsive to detecting an exiting child process, for determining whether the exiting child process has the identified process identifier; and
computer usable program code for saving information about the exiting child process if the exiting child process has the identified process identifier to form saved information.

12. The computer program product of claim 11 further comprising:
computer usable program code, responsive to detecting the exiting child process, for determining whether another child process in the set of child processes is still executing; and
computer usable program code, responsive to an absence of the another child process in the set of child processes that is still executing, for returning all saved information.

13. The computer program product of claim 11, wherein the saved information includes a return code for the exiting child process.

14. The computer program product of claim 11, wherein the saved information comprises processor cycles used by the exiting child process.

15. The computer program product of claim 10, wherein the first data structure includes a parent process identifier and a virtual parent process identifier.

16. A data processing system comprising:
a bus;
a communications unit connected to the bus;
a storage device connected to the bus, wherein the storage device includes computer usable program code; and
a processor unit connected to the bus, wherein the processor unit executes the computer usable program code to:
create a virtual root process for the software partition, wherein the virtual root process functions as a root process for the software partition; and
re-parent a set of child processes to the virtual root process in response to termination of a process having the set of child processes by retrieving a first data structure for the virtual root process and assigning the set of child processes to the virtual root process using the first data structure, wherein the virtual root process exits after the set of child processes completes execution, the first data structure includes a process identifier and a virtual process identifier, the set of child processes includes a child process, and assigning the set of child processes to the virtual root process using the first data structure includes adding the process identifier in the first data structure as a parent identifier in a second data structure for the child process and adding the virtual process identifier in the first data structure as a virtual parent identifier in the second data structure for the child process.

17. The data processing system of claim 16 wherein the processor unit further executes the computer usable program code to obtain a process identifier for the child process in the set of child processes to form an identified process identifier in response to an assignment of the child process to the virtual root process; determine whether an exiting child process has the identified process identifier in response to detecting the exiting child process; and save information about the exiting child process if the exiting child process has the identified process identifier to form saved information.

18. The data processing system of claim 17 wherein the processor unit further executes the computer usable program code to determine whether another child process in the set of child processes is still executing in response to detecting the exiting child process; and return all saved information in response to an absence of the another child process in the set of child processes that is still executing.

19. The data processing system of claim 17, wherein the saved information includes a return code for the exiting child process.

20. The data processing system of claim 17, wherein the saved information includes processor cycles used by the exiting child process.

21. A data processing system for managing a software partition in logical partitioned data processing system, the data processing system comprising:
creating means for creating a virtual root process for the software partition, wherein the virtual root process functions as a root process for the software partition; and
re-parenting means, responsive to termination of a process having a set of child processes, for re-parenting the set of child processes to the virtual root process by retrieving a first data structure for the virtual root process and assigning the set of child processes to the virtual root process using the first data structure, wherein the virtual root process exits after the set of child processes completes execution, the first data structure includes a process identifier and a virtual process identifier, the set of child processes includes a child process, and assigning the set of child processes to the virtual root process using the first data structure includes adding the process identifier in the first data structure as a parent identifier in a second data structure for the child process and adding the virtual process identifier in the first data structure as a virtual parent identifier in the second data structure for the child process.

22. The data processing system of claim 21 further comprising:

obtaining means, responsive to an assignment of the child process in the set of child processes to the virtual root process, for obtaining a process identifier for the child process to form an identified process identifier;

determining means, responsive to detecting an exiting child process, for determining whether the exiting child process has the identified process identifier; and saving means for saving information about the exiting child process if the exiting child process has the identified process identifier to form saved information.

23. The data processing system of claim 22 further comprising:

determining means, responsive to detecting the exiting child process, for determining whether another child process in the set of child processes is still executing; and returning means, responsive to an absence of the another child process in the set of child processes that is still executing, for returning all saved information.

* * * * *